United States Patent
Feliss et al.

(10) Patent No.: US 6,958,876 B2
(45) Date of Patent: Oct. 25, 2005

(54) LEAK DETECTION SYSTEM OF HARD DISK DRIVES WITH LUBRICANT RESERVOIR

(75) Inventors: Norbert A. Feliss, Sunnyvale, CA (US); Donald R. Gillis, San Jose, CA (US); Thomas A. Gregory, Campbell, CA (US); Sylvia Lui Lee, San Jose, CA (US); Vedantham Raman, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 453 days.

(21) Appl. No.: 09/916,854

(22) Filed: Jul. 27, 2001

(65) Prior Publication Data

US 2003/0021054 A1 Jan. 30, 2003

(51) Int. Cl.[7] .............................................. G11B 15/18
(52) U.S. Cl. ...................... 360/69; 360/97.03; 428/65.4
(58) Field of Search ........................... 360/97.02, 97.03, 360/69; 428/694 TP, 422, 64.1, 64.2, 65.3, 65.8, 695, 65.4; 508/504, 570, 450

(56) References Cited

U.S. PATENT DOCUMENTS

| | | | |
|---|---|---|---|
| 4,188,434 A | 2/1980 | Loran ........................... 428/65 |
| 4,501,324 A | 2/1985 | Sandiford et al. .......... 166/250 |
| 4,626,941 A | 12/1986 | Sawada et al. ......... 360/135 X |
| 4,755,469 A | 7/1988 | Showalter et al. ............. 436/27 |
| 4,758,366 A | 7/1988 | Parekh ......................... 252/68 |
| 4,789,913 A | 12/1988 | Gregory et al. .......... 360/97.03 |
| 4,990,283 A | 2/1991 | Visca et al. .................. 252/309 |
| 5,071,715 A | 12/1991 | Shoji et al. .................. 428/694 |
| 5,138,506 A | 8/1992 | Beck et al. .............. 360/97.03 |
| 5,149,453 A | 9/1992 | Parekh ......................... 252/68 |
| 5,200,867 A | 4/1993 | Albrecht et al. ..... 360/97.01 X |
| 5,229,899 A | 7/1993 | Brown et al. ............. 360/97.02 |
| 5,331,487 A | 7/1994 | Gregory et al. .......... 360/97.02 |
| 5,357,782 A | 10/1994 | Henry ......................... 73/40.7 |
| 5,440,919 A | 8/1995 | Cooper ....................... 73/40.7 |
| 5,485,327 A | 1/1996 | Yanagisawa ............. 360/97.02 |
| 5,494,596 A | 2/1996 | Law et al. .................... 252/54 |
| 5,559,650 A | 9/1996 | Repphun et al. ......... 360/97.02 |
| RE35,370 E | 11/1996 | Henry ......................... 73/40.7 |
| RE35,395 E | 12/1996 | Henry ......................... 73/40.7 |
| 5,602,085 A | 2/1997 | Peterson et al. ............. 508/579 |
| 5,650,563 A | 7/1997 | Cooper et al. ............... 73/40.7 |
| 5,663,127 A * | 9/1997 | Flynn et al. ................. 508/250 |
| 6,678,113 B2 * | 1/2004 | Feliss et al. ............. 360/97.02 |

FOREIGN PATENT DOCUMENTS

JP        2001131566 A  *  5/2001

OTHER PUBLICATIONS

U.S. Appl. No. 09/916,857, filed on Jul. 27, 2001, entitled, "Disk Drive Lubricant Reservoir Systems and Lubricants Used Therein", invented by T.A. Gregory; O. Melroy; T.M. Reith; and R.J. Waltman.

* cited by examiner

*Primary Examiner*—Andrew L. Sniezek
(74) *Attorney, Agent, or Firm*—Alan S. Raynes; Konrad Raynes & Victor LLP (57) ABSTRACT

A method for detecting leakage from a disk drive enclosure includes providing a lubricating composition having a lubricating material and a tag material therein. The tag material has a volatility characteristic that is amenable to analysis. The method includes measuring a concentration of the tag material in the vapor phase. By measuring a concentration of the tag material, a leak rate of the lubricating material can be determined. The lubricating composition may include a perfluoropolyether lubricating material and a halogenated sulfur tag material such as $SF_6$ and/or $S_2F_{10}$.

38 Claims, 8 Drawing Sheets

LEAK DETECTION SYSTEM OF HARD DISK DRIVES WITH LUBRICANT RESERVOIR

FIELD OF THE INVENTION

Embodiments of the present invention relate generally to disk drive systems and to lubrication of recording media within the systems.

RELATED ART

Hard disk drive systems typically include one or more rotatable disks having concentric data tracks defined for storing data, a recording head or transducer for reading data from and writing data to the various data tracks on each disk, and an air bearing slider for precisely holding the transducer element in close proximity to a selected track. By use of a vapor-phase reservoir system installed within a hard disk drive system, it is possible to continuously maintain a durable lubricant film on surfaces of the disks and transducer heads contained therein.

One approach uses a volatile lubricant placed in a specific location or in a plurality of locals within the drive's enclosure and is described in commonly assigned U.S. Pat. No. 4,789,913 to Gregory et al., U.S. Pat. No. 5,229,899 to Brown et al., and U.S. Pat. No. 5,331,487 to Gregory et al., each of which is hereby incorporated by reference in its entirety. The lubricant vapors are preferably uniformly distributed within the drive's enclosure, especially during use of the drive. The volatile lubricant source is typically in the form of a solid, a liquid, or mixtures thereof. The active surfaces of the disks and heads are bathed in these vapors to result in a dense, adsorbed film of lubricant. In order to control the thickness of this lubricant film, the vapor pressure is maintained at a nearly saturated condition. Several means for controlling the vapor pressure may be used. Regardless of the operational temperature of the drive, it is desirable to operate a lubricant reservoir system such that vapor conditions are fixed somewhere within the range of 10% to 95% of saturation (i.e., a P/Po condition of 0.10 to 0.95). The dynamic behavior of the reservoir system results in vapor-adsorbtion occurring on active surfaces whenever the adsorbate film becomes depleted by any means, but with such depletion principally caused by tribological interaction. Conversely, any thickening of the lubricant film will result in desorbtion/evaporation into the vapor phase, with the excessive lubricant being deposited at the reservoir's source(s).

The dynamic behavior of the reservoir system described above is made more complicated by air or vapor leakage from the substantially-sealed disk drive enclosure. Leakage results in the obvious loss of some volatile lubricant, and it also causes a suppression of the intended P/Po condition for which the reservoir system had been designed. The effect of a moderate leak rate can be reasonably compensated by placing an additional quantity of lubricant into the reservoir structure. Moreover, the leak-induced suppression of the intended P/Po condition can be reduced by enhancing the restorative response of the reservoir system through design modification. Yet, there is always some risk that a given drive may have an excessive leak rate, or that a fast leak rate may develop in the customer's environment. Either event could cause a drive to prematurely lose its lubricant supply, resulting in failure.

Drive leakage may be assessed in the manufacturing process by use of external equipment that measures the flow required to keep a drive pressurized at a moderate, fixed pressure applied to a breather port of the drive. Although such a test can roughly categorize the leak rate of a drive under static conditions or under operation, it may not be adequate for a substantially sealed drive employing a reservoir system that uses an expensive lubricant and expensive lubricant containment structure. A more accurate approach requires a direct measurement of the leak rate while the disk pack is spinning and without any pressurization. The common engineering approach to this measurement is cumbersome, slow and not very applicable to manufacturing processes. This method entails filling the drive's enclosure with a known gas (nitrogen or argon) which can be precisely analyzed. Once the drive reaches a stable operating temperature, a small aliquot of gas is withdrawn from the drive's enclosure for analysis. While being operated at very constant pressure over a period of time, sequential aliquots from the drive are analyzed to measure the rate of change in the concentration of the introduced gas as it is displaced by incoming air (and with a correction applied for the effect of removing each aliquot). From these data an accurate determination of the leak rate can be made. The method of analysis typically employs either mass spectrometry or gas chromatography. Unfortunately, these techniques are slow and expensive.

SUMMARY

Certain embodiments relate to a method for detecting leakage from a disk drive enclosure having a volatile lubricating material and a tag material incorporated therein. At least a portion of the lubricating material and the tag material are in the vapor phase The method includes measuring a concentration of the tag material in the vapor phase. In certain embodiments, by measuring a concentration of the tag material, a leak rate of the lubricating material can be determined. In an aspect of certain embodiments, the volatility of the tag material may be greater than the volatility characteristics of the lubricating material.

Another embodiment relates to a disk drive system including at least one disk adapted to store data. The system also includes at least one transducer adapted to read and write data to and from the disk. The system also includes a lubricant composition having a mixture of a volatile lubricant component adapted to lubricate the disk surface and a tag component, wherein the tag component has a volatility that enables the tag component to be detected in the vapor phase.

Another embodiment relates to a disk drive system including at least one disk adapted to store data. The system also includes at least one transducer adapted to read and write data to and from the disk. The system also includes a first source of a volatile lubricant and a second source of a tag component that is incorporated into a substantially non-volatile material such that it can be detected in the vapor phase.

Other embodiments relate to a lubricant composition for disk drive systems. In one such embodiment, the lubricant composition includes a perfluoropolyether material and a halogenated sulfur material.

Still other embodiments relate to a computer system including a disk drive and a disk drive enclosure. The computer system also includes a disk drive lubricant composition including a lubricant component and an tag component. The computer system also includes a sensor adapted to detect a quantity of the tag component in the vapor phase. In certain embodiments, the tag material may be contained within the lubricant phase. In other embodiments, the tag material may be contained within a different phase, such as a non-volatile phase placed in a different location from the lubricant source.

BRIEF DESCRIPTION OF THE DRAWINGS

Embodiments of the invention are described with reference to the accompanying drawings which, for illustrative purposes, are schematic and not necessarily drawn to scale.

DETAILED DESCRIPTION

Preferred embodiments relate to methods, systems and compositions used to determine the presence of leakage and measure the leakage rates of hard disk drives in the drive manufacturing process and thereafter. Preferred embodiments may also be used as a diagnostic tool to assess the integrated leakage of any drive, including providing an estimate of the amount of lubricant remaining in a disk drive reservoir structure.

Figure 1:
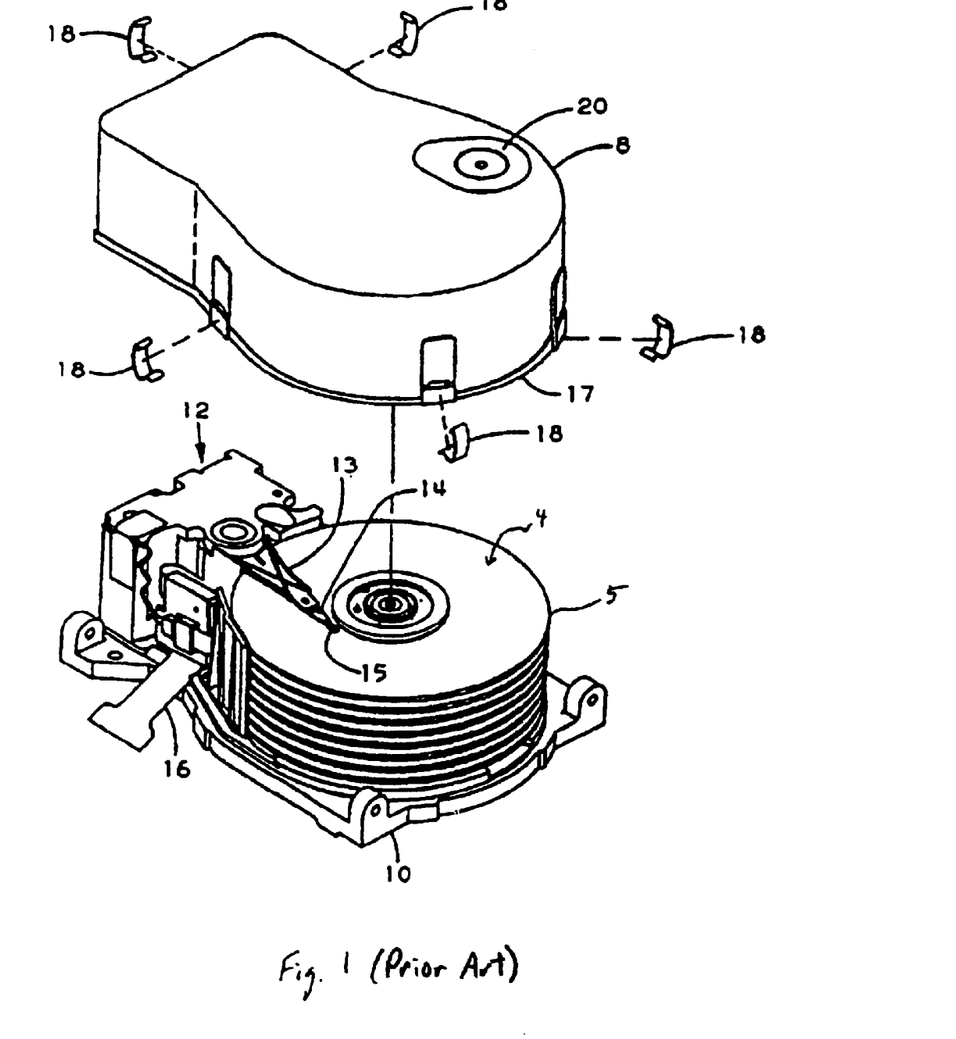
FIG. 1 illustrates a hard disk drive assembly.

FIG. 1 illustrates a typical magnetic hard disk data storage device with the cover 8 removed. A series of disks 5 are clamped together in axially spaced relation for rotation about a common axis and are mounted on a base plate 10. An actuator 12 carries a series of arms 13 that have secured thereto suspensions 14 that respectively carry transducers 15. Transducers 15 respectively confront disk surfaces 4 to write data to the disk or read data from the disk. The actuator arms 13 move about a common axis to cause the transducers 15 to translate from one concentric recording track to another concentric track on the disk surface. A flat cable 16 contains the conductors that carry signals from the transducers 15 to the circuitry exterior of the head disk enclosure. In the assembled condition the cover 8 may be sealed to base 10 by a gasket 17 and retained by a series of clips 18. The hard disk assembly is a substantially sealed enclosure surrounding the transducer heads and rotating data storage disks. A breather filter 20 may be provided and positioned to access the enclosed atmosphere at a location of low pressure. This filter 20 is provided to compensate for atmospheric and thermally induced temperature changes. To prevent contamination by vapors from outside the head-disk enclosure while the drive is not running, the breather filter 20 may be provided with an extended length diffusion passage to prevent or limit the introduction of vapor contamination. The hard disk assembly also includes a vapor transport system including a reservoir that contains a source of lubricant. Examples of vapor transport systems are described in commonly assigned U.S. Pat. No. 4,789,913 to Gregory et al., U.S. Pat. No. 5,229,899 to Brown et al., and U.S. Pat. No. 5,331,487 to Gregory et al., each of which is hereby incorporated by reference in its entirety.

Figure 2A:
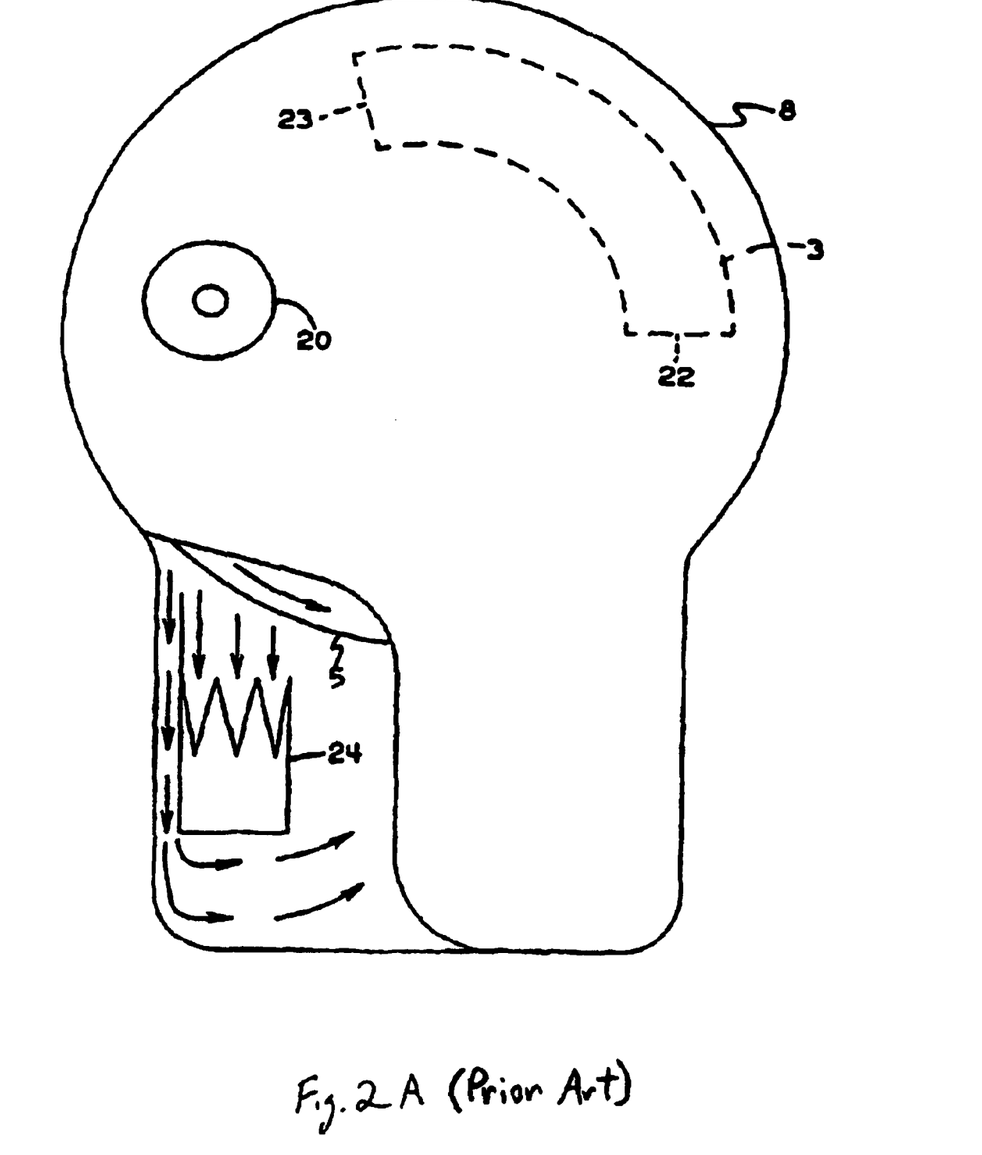
FIG. 2A illustrates a hard disk drive assembly including a reservoir structure for housing a lubricant composition.

FIG. 2A illustrates an example of a hard disk assembly, with the cover partially broken away, including a lubricant vapor transport system. A reservoir 3 is secured to the inner surface of the cover 8, and the reservoir 3 may include an air entrance 22 and an exit 23 to permit an air flow induced by rotation of disk 5 to pass through the reservoir 3. Another flow of air induced by disk rotation may be partitioned with one portion directed through a recirculating particulate filter 24.

In certain embodiments, a known quantity of a suitable tag or indicator molecule is incorporated or blended into the volatile lubricant used in the reservoir. Such a tag molecule may in certain embodiments be in a liquid form at elevated pressure and may be blended into a liquid volatile lubricant. Alternatively, the tag molecule may in certain embodiments be contained within an inert hydrocarbon liquid, plastic material, rubber, or a variety of high surface area inert materials. A preferred indicator is small, electronegative and pseudo-spherical in molecular structure so that it does not exhibit significant adsorbtion onto tribological surfaces (i.e., head and disk surfaces). A small fraction of the indicator is dissolved in the lubricant (for example, through miscibility or homogenization) and placed into the reservoir. The indicator molecule preferably has a volatility and structure that is amenable to analysis. However, the indicator should preferably be negligibly incorporated into the lubricant adsorbate film on the head and disk surfaces because of its small size and molecular geometry. The desired indicator preferably has sufficient volatility and a high electron-capture characteristic so as to enhance the analysis, and its use should not measurably diminish the composition and performance of the lubricant film maintained on the disks and heads in the disk drive system. In certain embodiments, the indicator may have a higher volatility than the lubricant material.

Figure 2B:
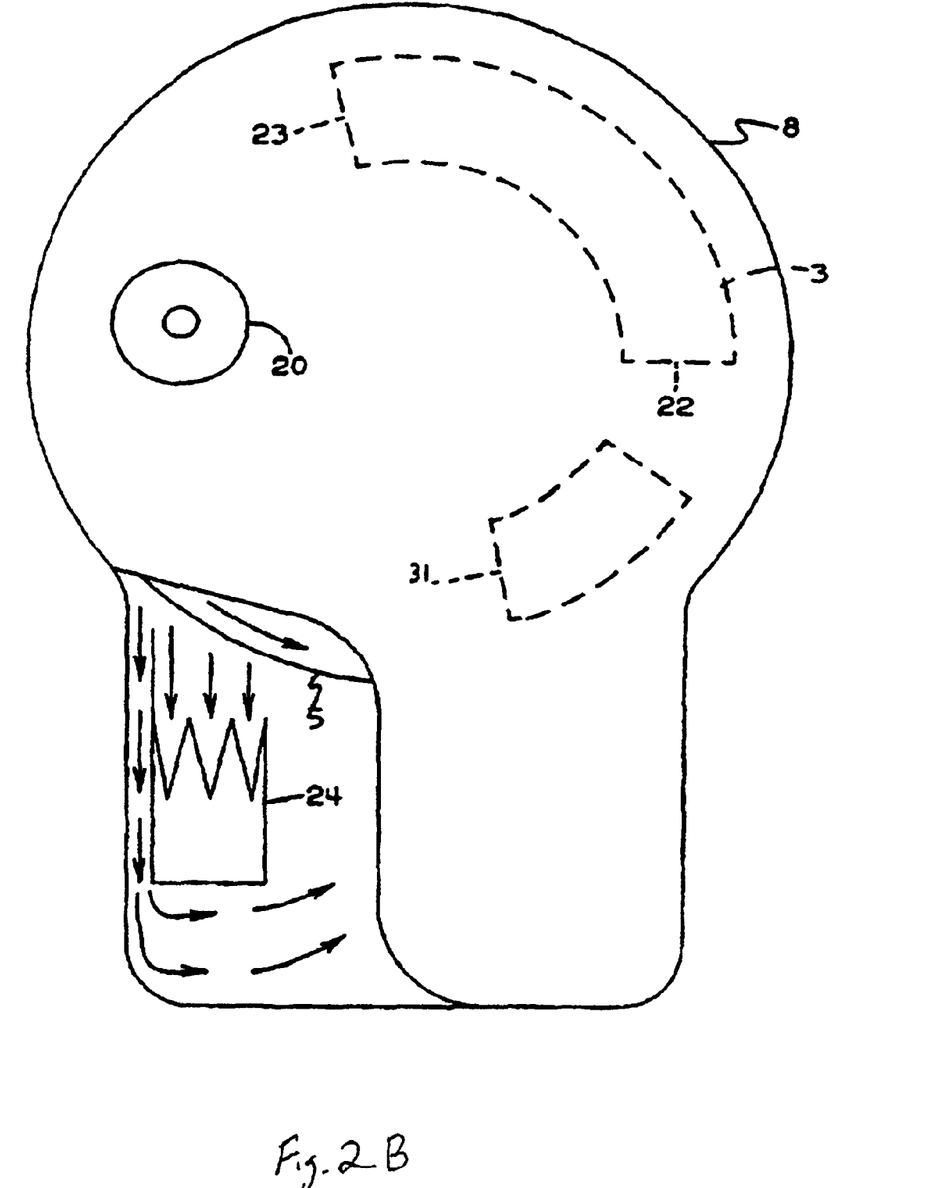
FIG. 2B illustrates a hard disk drive assembly including a separate lubricant source and tag material source.

Any leakage from the disk drive's enclosure will release the indicator molecules into the external environment for analysis. A sufficiently volatile, fluorinated compound, for example, can be easily analyzed at ambient pressure using inexpensive "sniffer" equipment. Such equipment can determine concentration by measuring the change in the rate of electron capture due to presence of halogenated compounds. Measurement equipment is preferably to be activated after file warm-up to avoid the surge of indicator vapors caused by the expulsion of air from within the disk enclosure. Increased sensitivity can be obtained by integration-trapping of the indicator vapors during drive testing followed by burst-analysis accomplished by heating the trap containing a molecular sieve or Tenex™. Another approach to enhancing detection, would be to operate the drives under test at a reduced pressure. One example of an indicator molecule is sulfur hexafluoride, $SF_6$. Sulfur hexafluoride ($SF_6$) meets all of the aforementioned criteria and it has negligible toxicological considerations, especially in view of the small amount used in the disk drive. Another example of an indicator molecule is disulfur decafluoride, $S_2F_{10}$, which may be used either alone or blended with sulfur hexafluoride to enhance the long-term persistence of indicator molecules in the drive so as to provide greater accuracy in drive analysis in long-term measurements. Other halogenated compounds, preferably halogenated sulfur compounds, may also have utility in embodiments of the present invention. A preferred lubricating material is a perfluoropolyether (PFPE). Other lubricating materials may include, for example, alcohols, hydrocarbon esters, stearic acid, palmitic acid, other carboxylic acids and volatile hydrocarbon compounds of the variety used in formulating greases as known in the art. In another embodiment, the lubricant composition includes a perfluoropolyether material and a halogenated sulfur material that is contained in a separate compartment mixed with a substantially non-volatile hydrocarbon oil. An example of an embodiment including a separate source compartment 31 for containing a tag material such as a halogenated sulfur mixed with a substantially non-volatile hydrocarbon oil is illustrated in FIG. 2B.

In certain embodiments, the selected indicator molecule is miscible with the lubricant, is relatively stable (nonreactive), and has a volatility characteristic that is amenable to analysis. Analysis can provide an estimation of the amount of lubricant remaining in the reservoir system. This estimation may be improved if certain operational parameters of the drive are available (i.e., drive temperature vs. time from data stored in the drive's performance registry). An example of an analytical procedure is as follows. If the drive can be made to spin, the concentration of the indicator is determined at a specified temperature while the drive is running. If the drive cannot be made to spin (non-operable), it can be heated and equilibrated at the specified temperature for sampling. For non-operable drives, or for drives having a long run-time, if desired, the more sensitive aliquot method may be used to accurately measure the concentration of the indicator vapors. Because the vapor pressure of the more volatile indicator material may experience a pseudo-exponential decline with time, as it is lost, it should be present for analysis as long as the drive contains some lubricant in its reservoir. Additionally, at some characterized temperature, the vapor concentration of the indicator molecule will be proportional to the fraction of lubricant in which it is homogenized. In addition, from the initial vapor concentration of the indicator material placed into the drive and from the initial quantity of volatile lubricant used to charge the reservoir, an estimation of the lubricant quantity that remains in the subject drive at the time of analysis can be determined. This estimation of remaining lubricant can be further refined by knowing the temperature history of the drive and by having determined the vapor pressure of the indicator molecule as a function of its mole fraction in the lubricant phase over a range of operational temperature conditions. A self consistency check of the remaining lubricant may be computed from the temperature history of the drive and the known vapor pressure dependency of the volatile lubricant. A disparate value would suggest either a procedural problem or that a change in the drive's leak rate had occurred since the drive had been manufactured.

Certain embodiments serve to minimize the possibility of premature loss of a volatile lubricant that would compromise the drive's expected lifetime. For failure analysis work, certain embodiments permit a non-destructive assessment of a drive's average leak rate and the amount of lubricant remaining in the reservoir unit(s). Failure analysis on drives can also indicate if a substantial change in the leak rate had occurred.

Figure 3:
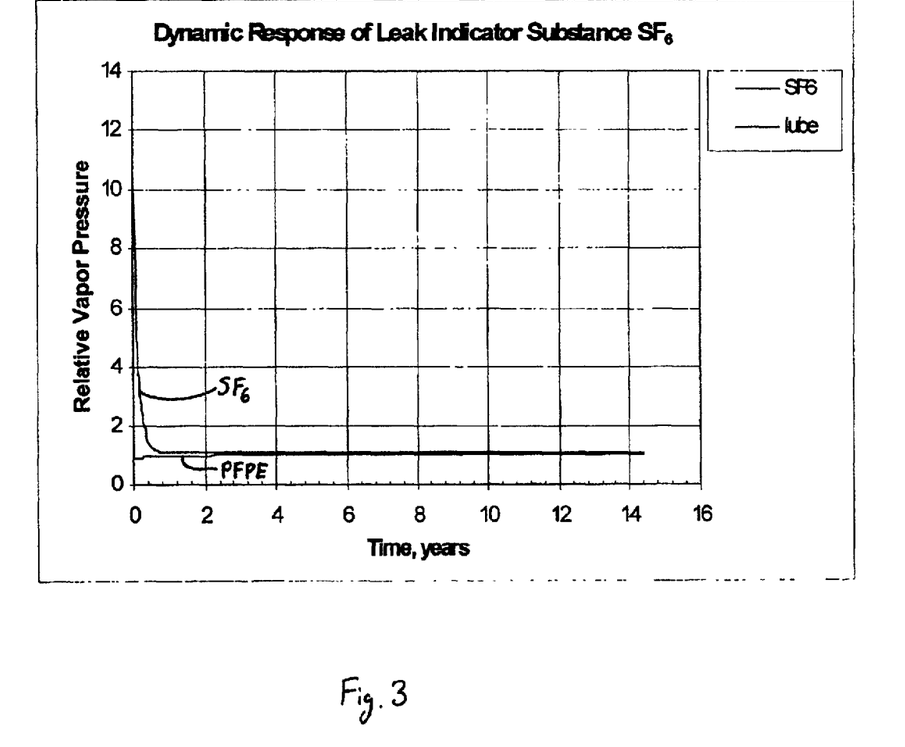
FIG. 3 illustrates a simulated response for a leaky disk drive including a volatile perfluoropolyether lubricant in which $SF_6$ has been dissolved.

Several simulated examples describing the dynamic response of a leak indicator material are set forth below and described in conjunction with FIGS. 3–5. FIG. 3 illustrates a simulated response for an excessively leaky drive equipped with an example lubricant reservoir system. In this case the reservoir contains a volatile perfluoropolyether lubricant in which $SF_6$ has been dissolved. The relative vapor pressure of the volatile lubricant is shown in arbitrary units along with the indicator, $SF_6$, both of which are plotted as a function of time. Because $SF_6$ has a repulsive molecular interaction when mixed with the lubricant, it exhibits a positive departure from ideality in contrast with an expected linear response versus mole fraction when Raoult's law is obeyed. Thus, the more volatile $SF_6$ is significantly "expelled" from the bulk lubricant phase to enhance its vapor presence. This condition results in a diminishing fractional presence of $SF_6$ in the homogenized mixture contained in the reservoir structure as leakage progresses. If the drive had no leakage (hermetically sealed), the vapor pressure of both components would remain at a constant value. When the $SF_6$ is at its maximum concentration, as a diluent in the lubricant phase, the vapor pressure of the lubricant is very slightly suppressed. This suppression is believed to be inconsequential to the resulting lubricant film maintained on the active surfaces of heads and disks.

Figure 4:
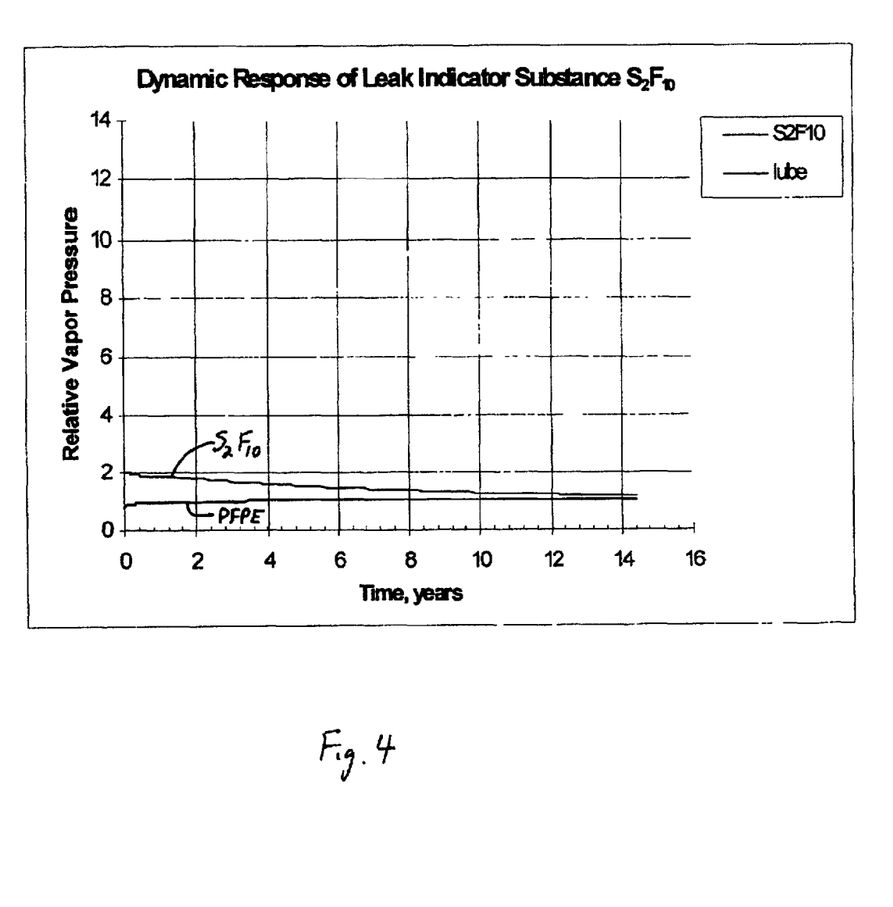
FIG. 4 illustrates a simulated response for a leaky disk drive including a volatile perfluoropolyether lubricant in which $S_2F_{10}$ has been dissolved.

FIG. 4 shows the same response as in the case of FIG. 3 for the less volatile molecule $S_2F_{10}$, which results in less loss for a leaky file. The less volatile $S_2F_{10}$ allows an extended range for motoring and assessing the effects of file leakage.

Figure 5:
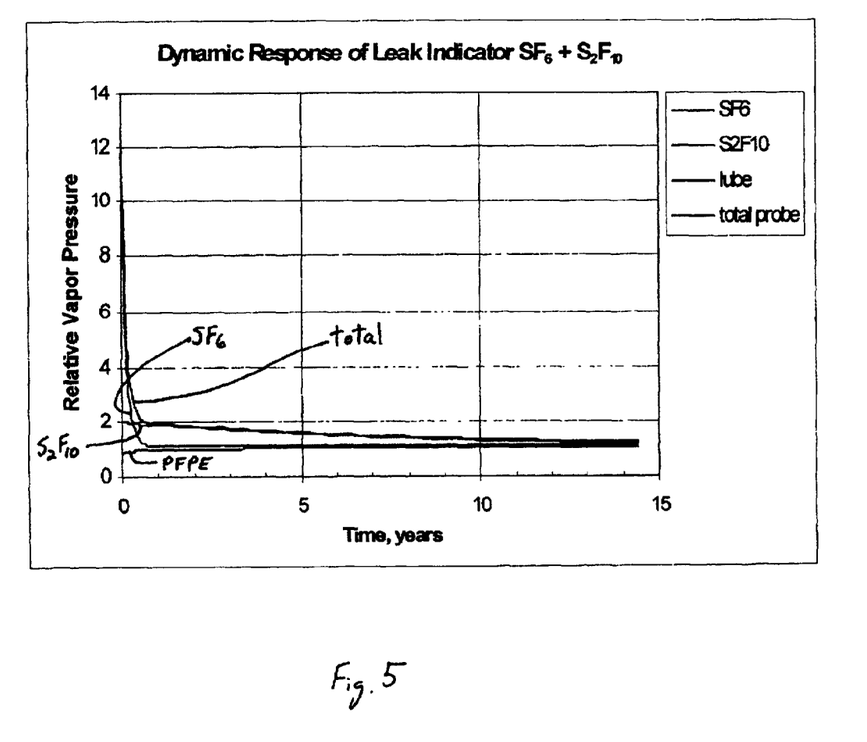
FIG. 5 illustrates a simulated response for a leaky disk drive including a volatile perfluoropolyether lubricant in which $SF_6$ and/or $S_2F_{10}$ have been dissolved.

FIG. 5 shows the effect of homogenizing a mixture $SF_6$ and $S_2F_{10}$ incorporated into the volatile lubricant. FIG. 5 shows both $SF_6$ and $S_2F_{10}$ individually, and the combination of $SF_6$ and $S_2F_{10}$ (labeled as "total"). This approach gives high sensitivity allowing fast analysis using inexpensive equipment in the early periods of a drive's lifetime, and it can give greater sensitivity for substantially sealed drives that will be useful throughout its lifetime. The less volatile $S_2F_{10}$ extends the ability to monitor loss over the operational lifetime for leaky drives. In the examples described above, the lubricant was sufficiently abundant in the reservoir (safety factor) to maintain lubricant vapor pressure. The expulsion of the sulfur compound due to leakage allows for an assessment of leak rate and remaining lubricant.

Figure 6:
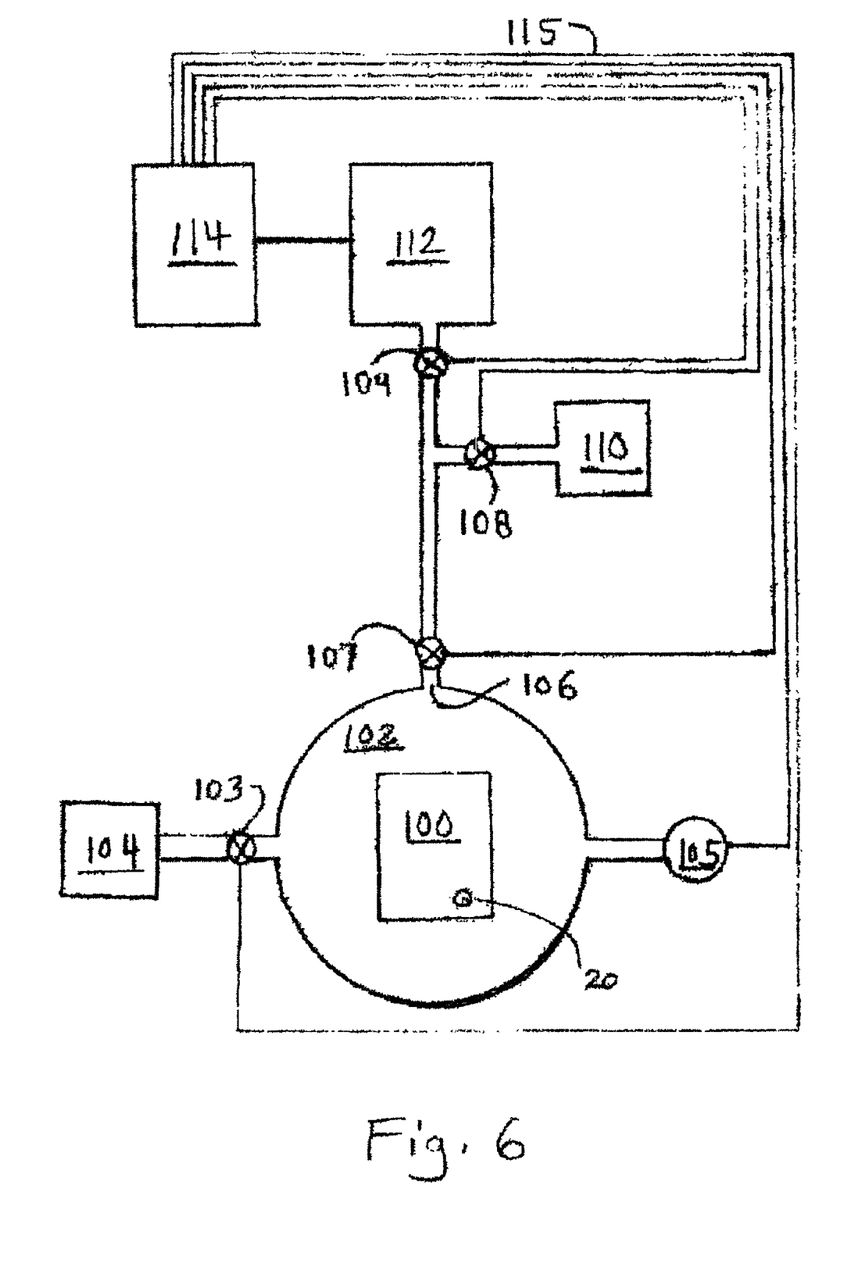
FIG. 6 illustrates a schematic view of a system for measuring the amount of a tracer molecule in a disk drive enclosure.

One example of a testing procedure for evaluating the leak rate of a disk drive assembly is set forth in FIG. 6. A hard disk drive 100 is placed into a vacuum chamber 102 such as a bell jar. The vacuum chamber includes a gas inlet valve 103 through which a supply of gas 104 such as clean air may be introduced into the chamber 102. The chamber may also include a vacuum gage 105 and a gas outlet 106 through which the gas 104 and any gas escaping from the disk drive 100 may flow to the leak detector 112. For certain analysis with the breather filter 20 temporarily taped shut on drive 100, vacuum pump 110 allows evacuation of the bell jar 102 via valves 107 and 108, with valves 103 and 109 being closed. After an equilibration period with valves 103, 108 and 109 closed, gas 104 is admitted by opening value 103 to bring the pressure to near-ambient conditions in preparation for analysis, which proceeds when valve 109 is opened to leak detector 112 facilitated by gas flow 104 via open valve 103. The leak detector may be connected to a personal computer 114 for control and data acquisition and to control valves 103, 107, 108, 109 and to monitor pressure gage 105 via electrical control lines 115. More than one drive can be simultaneously tested for leakage if the mean leak rate is low and if the occurrence of defects is also low. One example of a detector that may be used is the AUTOTRAC™ automatic tracer gas monitor, available from Lagus Applied Technology, Inc., of San Diego, Calif. The AUTOTRAC™ detector can measure a variety of tracer gases and can detect levels down to $5 \times 10^{-12}$ parts $SF_6$ in air. Other types of detectors may also be used as known in the art.

Figure 7A:
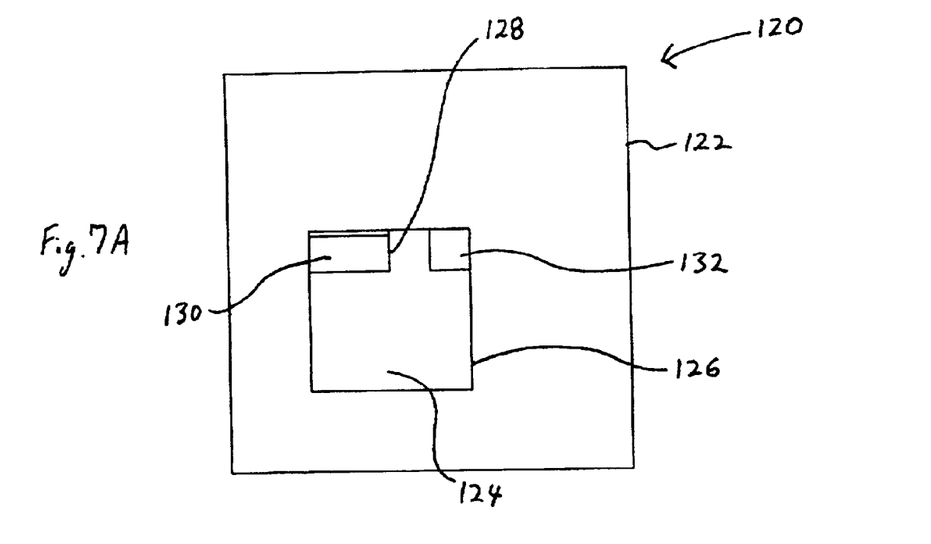
FIGS. 7A and 7B illustrate cross sectional views of a computer including a disk drive and a tag material detector.
Figure 7B:
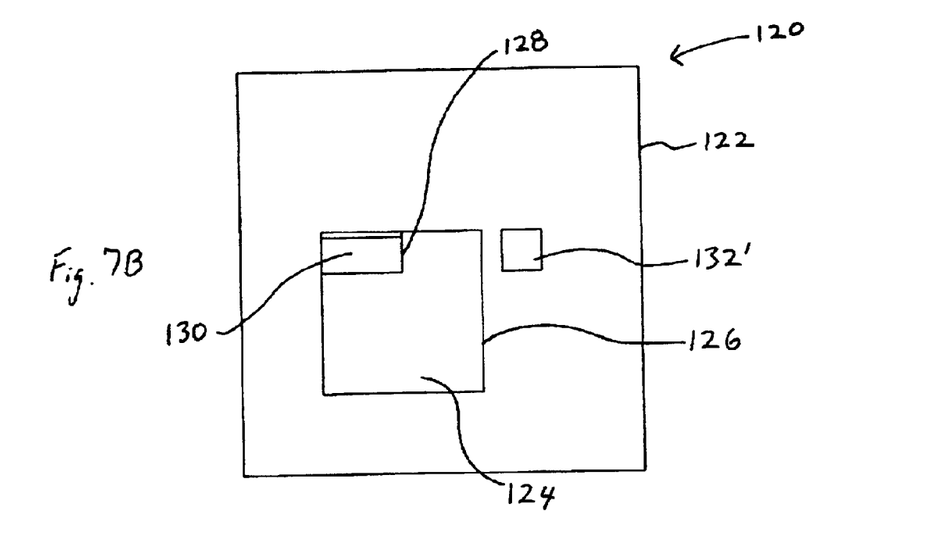

Other embodiments may include a detector placed directly inside of a computer enclosure and connected to the computer itself, so that the computer can query the drive itself at regular intervals to evaluate the leak rate over time. For example, as illustrated in FIGS. 7A and 7B, a computer 120 having an enclosure 122 includes disk drive assembly 124 having disk drive assembly enclosure 126. The computer 120 includes a disk drive lubricant reservoir 128. The lubricant reservoir 128 includes a volatile lubricant composition 130 including a lubricating component and a tag component. For example, the lubricating component may be a perfluoropolyether and the tag component may be at least one of $SF_6$ and $S_2F_{10}$ blended into the lubricating component. A sensor may be positioned inside of the computer to sense the presence of the tag component. In FIG. 7A, the sensor 132 is located inside the disk drive assembly enclosure 124. Alternatively, as illustrated in FIG. 7B, the sensor 128' is located outside of the disk drive assembly enclosure 124 and inside of the computer enclosure 122. The computer can be programmed to query the sensor at regular intervals and determine the extent to which the lubricant composition has leaked from the disk drive assembly. If desired, the computer can alert the user as to the leakage condition.

Another embodiment relates to a disk drive system including at least one disk adapted to store data. The system also includes at least one transducer adapted to read and write data to and from the disk where a volatile lubricant is employed. In a separate compartment a tag component is incorporated into a substantially non-volatile material such that it has a sufficient volatility and is amenable to analysis.

Other embodiments relates to a lubricant composition for disk drive systems. The lubricant composition may be the form of a liquid. In one embodiment, the lubricant composition includes a perfluoropolyether material and a halogenated sulfur material. In a different embodiment, the lubricant composition includes a perfluoropolyether material and a halogenated sulfur material that is contained in a separate compartment mixed with a substantially non-volatile hydrocarbon oil. In another embodiment, the lubricant composition includes a lubricant material and a tag material, wherein the tag material has a sufficient volatility and is amenable to analysis.

It will, of course, be understood that modifications of the present invention, in its various aspects, will be apparent to those skilled in the art. Other embodiments are possible, their specific features depending upon the particular application. For example, a variety of disk drive configurations, geometries, and components may be may be employed in disk drive systems instead of or in addition to those discussed above.

What is claimed:

1. A method for detecting leakage from a disk drive enclosure, comprising:
   providing a disk drive enclosure having a lubricating material and a tag material therein, wherein at least a portion of the lubricating material and the tag material are in the vapor phase; and
   measuring a concentration of the tag material in the vapor phase.
2. A method as in claim 1, wherein the tag material comprises a halogenated material.
3. A method as in claim 2, wherein the halogenated material comprises a halogenated sulfur material.
4. A method as in claim 1, wherein the tag material comprises at least one material selected from the group consisting of $SF_6$ and $S_2F_{10}$.
5. A method as in claim 4, wherein the lubricating material comprises a perfluoropolyether.
6. A method as in claim 1, wherein the tag material comprises $SF_6$ and $S_2F_{10}$.
7. A method as in claim 1, further comprising determining a leak rate of the lubricating material from the vapor phase concentration of the tag material.
8. A method as in claim 1, further comprising determining an amount of lubricating material remaining in the disk drive enclosure using the concentration of the tag material.
9. A method as in claim 1, wherein the measuring a vapor phase concentration of the tag material is conducted inside of the disk drive enclosure.
10. A method as in claim 9, wherein the measuring is carried out over a period of time at a predetermined interval.
11. A method as in claim 1, further comprising:
    measuring a concentration of the tag material outside of the enclosure over a time interval and determining a leak rate of the lubricating material from the disk drive enclosure.
12. A method as in claim 11, further comprising determining a quantity of the lubricating material remaining in the disk drive enclosure.
13. A method as in claim 1, further comprising measuring a concentration of the tag material outside of the disk drive enclosure over a period of time and determining a leak rate of the lubricating material from the disk drive enclosure.
14. A method as in claim 13, further comprising determining a quantity of the lubricating material remaining in the disk drive enclosure after the period of time.
15. A method as in claim 1, wherein the tag material has a volatility that is greater than that of the lubricating material.
16. A disk drive system comprising:
    at least one disk adapted to store data;
    at least one transducer adapted to read and write data to and from the disk; and
    a lubricant composition comprising a lubricant component adapted to lubricate the disk surface and a tag component, wherein the tag component has a volatility that enables the tag to be detected in the vapor phase.
17. A disk drive system as in claim 16, wherein the tag component comprises a halogenated sulfur material.
18. A disk drive system as in claim 16, wherein the tag component comprises at least one material selected from the group consisting of $SF_6$ and $S_2F_{10}$.
19. A disk drive system as in claim 18, wherein the lubricating component comprises a perfluoropolyether.
20. A disk drive system as in claim 16, wherein the tag component comprises $SF_6$ and $S_2F_{10}$.
21. A disk drive system as in claim 16, wherein the tag component volatility is greater than that of the lubricant.
22. A disk drive system comprising:
    at least one disk adapted to store data;
    at least one transducer adapted to read and write data to and from the disk;
    a first source of a volatile lubricant; and
    a second source of a tag component incorporated into a substantially non-volatile material, wherein the tag component has a volatility that enables the tag component to be detected in the vapor phase.
23. A disk drive system as in claim 22, wherein the volatile lubricant includes a perfluoropolyether material and the tag component comprises a halogenated sulfur material that is incorporated into a hydrocarbon oil.
24. A lubricant composition for disk drive systems comprising a lubricant material and a tag material, wherein the tag material is adapted to be detected in the vapor phase.

25. A lubricant composition as in claim 24, wherein the tag material comprises a halogenated sulfur molecule.

26. A lubricant composition as in claim 24, wherein the tag material comprises at least one material selected from the group consisting of $SF_6$ and $S_2F_{10}$.

27. A lubricant composition as in claim 26, wherein the lubricant material comprises a perfluoropolyether.

28. A lubricant composition as in claim 26, wherein the lubricant material comprises a material selected from the group consisting of alcohols, hydrocarbon esters, stearic acid, palmitic acid, other carboxylic acids.

29. A lubricant composition as in claim 26, wherein the lubricant material comprises a material selected from the group consisting of a perfluoropolyether or a volatile hydrocarbon compounds of the variety used in formulating greases.

30. A lubricant composition as in claim 24, wherein the tag material comprises $SF_6$ and $S_2F_{10}$.

31. A computer system comprising:
   a disk drive including a disk drive enclosure;
   a disk drive lubricant composition including a lubricant component and a tag component; and
   a sensor adapted to detect a quantity of the tag component in the vapor phase.

32. A computer system as in claim 31, wherein the sensor is positioned outside the disk drive enclosure.

33. A computer system as in claim 31, wherein the sensor is positioned inside the disk drive enclosure.

34. A computer as in claim 31, where the computer includes a computer program that is capable of causing the computer system to measure the concentration of the tag component in the vapor phase at a predetermined time interval.

35. A computer as in claim 31, wherein the computer includes a computer program that is capable of causing the computer system to measure the concentration of the tag component and determine at least one of a leak rate of the lubricant material from the disk drive assembly and an amount of the lubricant material in the disk drive assembly.

36. A computer as in claim 31, wherein the tag component has a volatility that is greater than that of the lubricant.

37. A computer as in claim 31, further comprising a lubricant component source and a target component source, wherein the lubricant component source is separate from the tag component source.

38. A computer as in claim 31, further comprising a source that contains both the lubricant component and the tag component.

* * * * *

UNITED STATES PATENT AND TRADEMARK OFFICE
CERTIFICATE OF CORRECTION

PATENT NO. : 6,958,876 B2  Page 1 of 1
APPLICATION NO. : 09/916854
DATED : October 25, 2005
INVENTOR(S) : Norbert A. Feliss et al.

It is certified that error appears in the above-identified patent and that said Letters Patent is hereby corrected as shown below:

Column 9, line 14, replace "a volatile" with -- volatile -- .

Signed and Sealed this

Seventeenth Day of April, 2007

JON W. DUDAS
*Director of the United States Patent and Trademark Office*